Aug. 26, 1969     E. GEYKEN     3,463,711
ELECTROLYTIC METHOD AND APPARATUS FOR RECOVERING
SILVER FROM FIXING BATHS
Filed April 7, 1965

INVENTOR:
ERWIN GEYKEN

BY

Michael J. Striker
his ATTORNEY

United States Patent Office 3,463,711
Patented Aug. 26, 1969

3,463,711
ELECTROLYTIC METHOD AND APPARATUS FOR RECOVERING SILVER FROM FIXING BATHS
Erwin Geyken, Munich, Germany, assignor to Agfa Aktiengesellschaft, Leverkusen, Germany
Filed Apr. 7, 1965, Ser. No. 446,218
Claims priority, application Germany, Apr. 24, 1964, A 45,858
Int. Cl. C22d 1/12, 1/02
U.S. Cl. 204—109                                    8 Claims

ABSTRACT OF THE DISCLOSURE

A method and apparatus for reclaiming silver from used photographic mixing baths into which electrodes extend and in which a circuit supplying the electrodes with DC current is intermittently opened and closed by means controlled by films conveyed through the bath.

---

Figure 1:
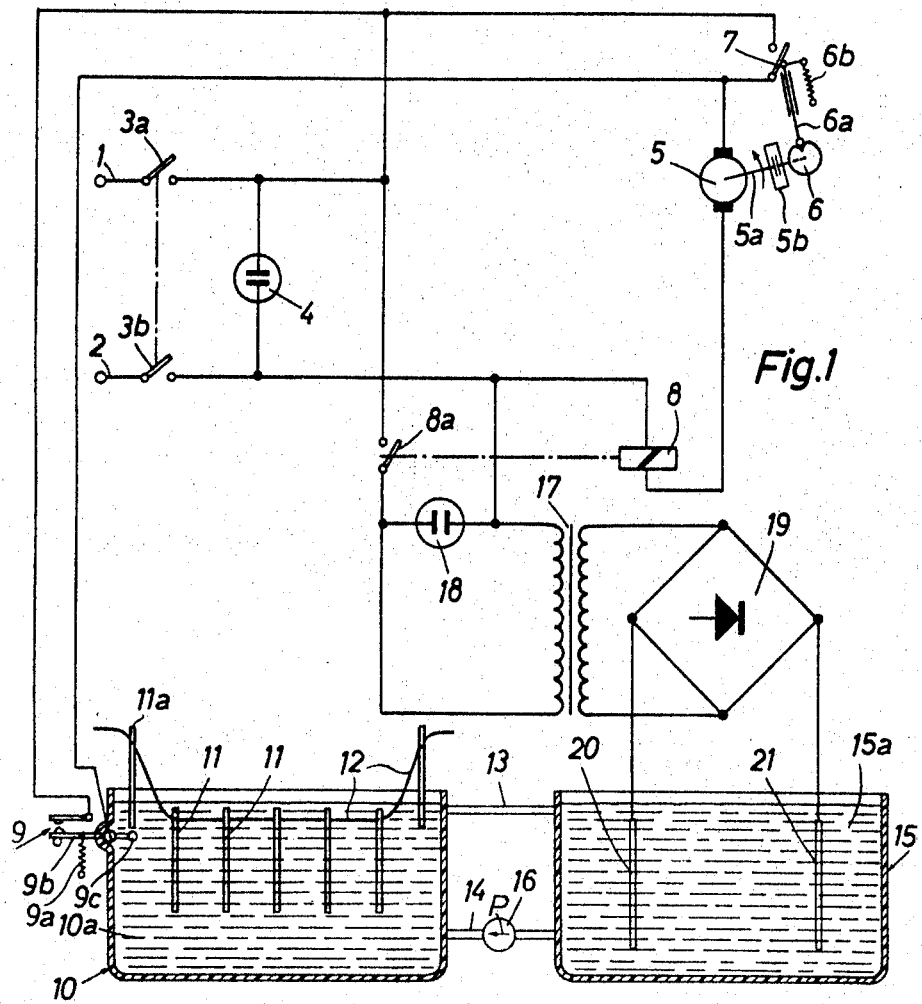

The present invention relates to reclamation of metals from electrolytes, particularly to reclamation of silver from spent treating liquids. Still more particularly, the invention relates to a method and apparatus for recovering silver from used photographic fixing baths by an electrolytic process.

It is well known that spent photographic fixing baths contain substantial quantities of silver which can be recovered by electrolytic deposition on cathodes suspended in the electrolyte. A serious drawback of presently utilized methods is that, in order to accumulate such quantities of spent fixer which would warrant electrolytic recovery of silver, the fixer must be collected and stored over extended periods of time so that it cannot be reused following the reclamation of silver therefrom.

Accordingly, it is an important object of the present invention to provide a novel and improved method of electrolytically reclaiming silver from fixing baths according to which the percentage of silver in the bath remains substantially constant so that the effectiveness of the fixer decreases only gradually.

Another object of the invention is to provide a method of the just outlined characteristics according to which the recovery of silver may take place simultaneously with normal use of the fixer as a treating liquid for photographic films.

A further object of the invention is to provide a method of reclaiming silver from photographic fixing baths according to which the recovery of silver may be carried out in response to entry of films into the bath and according to which the recovery of silver is carried out at such a rate that the bath contains a nearly constant percentage of silver.

An additional object of the invention is to provide an improved apparatus for carrying out the above outlined method and to construct the apparatus in such a way that the equipment necessary for recovery of silver cannot and does not interfere with the primary function of the fixing bath.

Still another object of the invention is to provide a fully automatic apparatus of the just described character which may be readily adjusted to recover silver at a desired rate and which can be used with equal advantage in comparatively small tanks as well as in tanks which contain very large quantities of electrolyte such as are needed by commercial establishments for large-scale treatment of photographic film.

A concomitant object of the invention is to provide a novel attachment which may be used in or with conventional tanks for fixing baths to recover silver at a predetermined rate.

Briefly stated, one feature of my invention resides in the provision of a method of reclaiming a metal from a used electrolyte, particularly for reclaiming silver from photographic fixing baths. The method comprises the steps of introducing developed films into a supply of fixer which removes surplus silver from the films, and simultaneously recovering silver from the thus enriched fixer by an electrolytic process. The recovery of silver from the fixer may take place intermittently, for example, in response to admission of consecutive films into the fixer, and each such intermittent recovery may result in deposition of the same quantity of silver as the quantity which is withdrawn from a single film. The thus recovered silver deposits on a cathode which constitutes one of a pair of electrodes immersed in the fixer.

By resorting to the above-outlined method, I can maintain the quantity of silver in the fixer constant, or substantially constant, for extended periods of time so that the effectiveness of the fixer is reduced only gradually with resultant savings in chemicals. The recovery of silver in dependency on the rate at which the films are transported through the fixer can be regulated with considerable accuracy, particularly over extended periods of time, because the consumption of chemicals per unit area of treated material varies very little or not at all.

Figure 2:
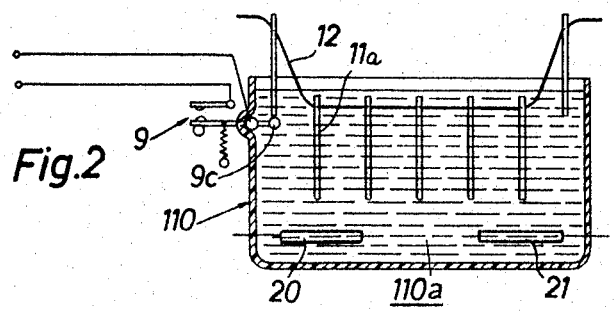

The novel features which are considered as characteristic of the invention are set forth in particular in the appended claims. The improved apparatus itself, however, both as to its construction and the mode of operating the same, together with additional features and advantages thereof, will be best understood upon perusal of the following detailed description of certain specific embodiments with reference to the accompanying drawings, in which:

FIG. 1 is a diagrammatic side elevational view of an apparatus which embodies one form of my invention and which comprises two separate tanks for a fixing bath, the tanks being shown in section; and FIG. 2 is a section of a tank which is utilized in a slightly modified apparatus.

Referring to FIG. 1, the numerals 1 and 2 denote two leads which are connected to a source of AC current. A main switch comprises two movable contacts 3a, 3b which are respectively installed in the leads 1, 2. When the main switch is closed, it completes the circuit of a signal lamp 4. The circuit of FIG. 1 further comprises an electric motor 5 whose output shaft 5a is connected with an adjustable timer including a cam 6 cooperating with a follower 6a which can open or close a control switch 7. The follower 6a is biased by a spring 6b which tends to open the control switch 7.

The motor 5 is connected in series with a relay 8 and the control switch 7 is connected in parallel with a starter switch 9. This starter switch 9 is mounted on a tank 10 which contains a supply of electrolyte, e.g. a fixing bath 10a. The movable contact 9b of the starter switch 9 is biased by a spring 9a which tends to keep the switch open, and this movable contact includes a trip 9c which extends into the fixing bath 10a and into the path of frames 11 for exposed photographic film. Such frames are suspended from and travel with a customary conveyor 12, for example, a chain conveyor, a roller conveyor or the like. Each frame 11 closes the starter switch for a short period of time to thus complete the circuit of the motor 5 provided, of course, that the signal lamp 4 is on, i.e., that the main switch 3a, 3b is closed.

If the frames 11 are replaced by strips of exposed film or other bodies of silver-containing material, the strips will close the starter switch 9 through the intermediary of the trip 9c or another suitable sensing device which is depressed or otherwise displaced by consecutive strips.

When the relay 8 is energized, it closes a switch 8a which is connected in circuit with two electrodes 20, 21 extending into a secondary tank 15 containing a fixing bath 15a.

The tanks 10, 15 are connected to each other by a first conduit 14 which contains a circulating pump 16 and by a second conduit 13 which insures that the level of the bath 10a is the same as that of the bath 15a. The pump 16 may operate constantly to draw liquid from the tank whereby the same quantity of liquid flows from the tank 10 and back to the tank 15.

The electrodes 20, 21 receive DC current from a rectifier 19 which is connected with the secondary winding of a transformer 17. The primary winding of this transformer is connected with the lead 2 and with the lead 1 (via switch 8a). A second signal lamp 18 lights up when the transformer 17 is connected to the source of electric current.

The apparatus of FIG. 1 is operated as follows:

The main switch 3a, 3b is closed and the pump 16 is running but the switches 7, 8a and 9 are open. When the frame 11a engages and pivots the trip 9c, the starter switch 9 closes and completes the circuit of the motor 5 and relay 8. The relay is energized and closes the switch 8a which completes the circuit of the primary winding of the transformer 17. The spring 9a automatically opens the starter switch 9 as soon as the frame 11a advances past the trip 9c but the motor 5 continues to run because its output shaft 5a has changed the angular position of the timer cam 6 so that the follower 6a closes the control switch 7 which is connected in parallel with the starter switch 9. In other words, the switch 9 serves to complete the circuit of the motor 5 and, in the illustrated embodiment, this circuit then remains completed during a full revolution of the cam 6. The electrodes 20, 21 receive a pulsating DC current as long as the motor 5 is running, i.e., as long as the relay 8 remains energized and keeps the switch 8a closed. The silver contained in the fixer bath 15a deposits on the cathode and the rotational speed of the cam 6 may be selected in such a way that the cathode collects the same quantity of silver as the quantity which is withdrawn by the fixing bath 10a from the silver-containing body in the frame 11a. The connection between the motor 5 and cam 6 may include a variable speed transmission 5b of any known design which can regulate the rotational speed of the cam and determines the exact length of intervals during which the cathode collects pure silver from the electrolyte in the tank 15.

The conduit 13 insures that the level of fixing bath 10a is the same as that of the bath 15a, and the pump 16 delivers to the tank 10 a continuous stream of regenerated fixer.

It was found that the apparatus of FIG. 1 can recover pure silver at any desired rate. The electric circuit of the apparatus is very simple so that it is not prone to malfunction and its operation is fully automatic. The intensity of regeneration of the fixing bath 15a is a function of the rate at which the films enter the bath 10a, and the electrodes 20, 21 receive current intermittently at intervals determined by the speed of the conveyor 12. The flow of current lasts for periods whose length is selected by the setting of the transmission 5b, by the r.p.m. of the motor 5 and/or by the configuration of the cam 6.

If the tank 10 is rather large, the secondary tank 15 may be omitted and the electrodes 20, 21 may be installed in the same tank 110 (see FIG. 2) in which the films are treated by immersion into a fixing bath 110a. Of course, the electrodes 20, 21 are positioned in such a way that they cannot interfere with movements of the film.

It is further clear that the apparatus of FIG. 1 or 2 can be utilized for regeneration of other types of electrolytes.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be secured by Letters Patent is:

1. An apparatus for reclaiming silver from electrolytes, particularly from used photographic fixing baths comprising tank means arranged to accommodate a supply of electrolyte; electrode means extending into the electrolyte in said tank means; means for advancing bodies of silver-containing materials through the electrolyte in said tank means whereby the electrolyte withdraws surplus silver from such material; a source of electrical energy connected in circuit with said electrode means; starter means for temporarily completing said circuit in response to engagement with consecutive bodies of silver-containing material advanced through the electrolyte; and adjustable timer means in said circuit and started when said starter means closes said circuit for maintaining said circuit closed and for opening said circuit after elapse of a predetermined interval of time following completion of the circuit by said starter means so that the deposition of silver on said electrode means takes place simultaneously with removal of surplus silver from said material and at the same rate at which the electrolyte is enriched with silver.

2. An apparatus as defined in claim 1, wherein said starter means comprises a normally open starter switch having a fixed contact and a movable contact, a portion of said movable contact extending into the path of said bodies so that each consecutive body temporarily completes said circuit to start said timer means.

3. An apparatus as set forth in claim 2, wherein said portion of the movable contact extends into the electrolyte so that said starter switch is closed by bodies of silver-containing material which are about to be relieved of surplus silver in the electrolyte.

4. An apparatus as set forth in claim 2, wherein said circuit further comprises an electric motor, a normally open control switch connected in parallel with said starter switch, said timer means being operated by said motor to close said control switch for a selected period of time so that the length of intervals during which said circuit is closed is determined by said timer means.

5. An apparatus as set forth in claim 4, wherein said timer means comprises a cam driven by said motor means, and a follower operatively connected with said control switch and arranged to track said cam.

6. An apparatus as set forth in claim 4, wherein said source of electrical energy is a source of AC current, said circuit further comprising transformer means whose primary winding is connected with said source when said motor is running and rectifier means connected between said electrode means and the secondary winding of said transformer.

7. An apparatus as set forth in claim 4, and including variable speed transmission means between said motor and said timer means.

8. A method of reclaiming silver from treating liquids, particularly from used photographic fixing baths, comprising the steps of moving through a supply of treating liquid a series of separated silver-containing films whereby the liquid withdraws surplus silver from consecutive films; and electrolytically recovering silver from the liquid at adjustable time intervals initiated by the movement of said films through the liquid and so adjusted that silver is recovered from the liquid at the same rate at which the liquid withdraws silver from consecutive films so as to maintain in the liquid a constant low silver concentration.

(References on following page)

References Cited

UNITED STATES PATENTS

| | | | |
|---|---|---|---|
| 756,328 | 4/1904 | Christy | 204—235 |
| 1,866,701 | 7/1932 | Garbutt et al. | 204—236 |
| 1,900,893 | 3/1933 | Hickman | 204—238 |
| 2,102,308 | 12/1937 | Daw | 204—202 |
| 2,428,141 | 9/1947 | Burkhardt | 204—202 |
| 2,724,691 | 11/1955 | La Verne | 204—204 |
| 2,924,564 | 2/1960 | Jackson | 204—204 |
| 3,003,942 | 10/1961 | Cedrone | 204—109 |
| 3,099,275 | 7/1963 | Pianowski | 204—198 |
| 3,276,983 | 10/1966 | Dolan et al. | 204—198 |

FOREIGN PATENTS 621,677  11/1935  Germany.

JOHN H. MACK, Primary Examiner

H. M. FLOURNOY, Assistant Examiner

U.S. Cl. X.R.

204—205, 234